United States Patent
Handley

(10) Patent No.: US 6,778,710 B1
(45) Date of Patent: Aug. 17, 2004

(54) METHOD FOR GENERATING INCREASING SHIFT-INVARIANT FILTERS

(75) Inventor: John C. Handley, Fairport, NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/559,506

(22) Filed: Apr. 27, 2000

(51) Int. Cl.$^7$ ................................................. G06K 9/40
(52) U.S. Cl. ...................... 382/260; 708/300; 708/322; 708/819
(58) Field of Search ............................... 382/232, 260, 382/261, 262, 263, 264, 265; 708/191, 205, 209, 234, 497, 552, 710, 821, 5, 300, 314, 322, 819; 712/16, 202, 232, 221, 211, 245; 702/17

(56) References Cited

U.S. PATENT DOCUMENTS

| | | | | |
|---|---|---|---|---|
| 4,589,084 A | * | 5/1986 | Fling et al. ................. | 708/551 |
| 4,661,948 A | * | 4/1987 | Shapiro et al. ............. | 370/295 |
| 4,674,045 A | * | 6/1987 | Kerber et al. ............... | 382/260 |
| 4,771,396 A | * | 9/1988 | South et al. ................. | 708/319 |
| 4,941,191 A | * | 7/1990 | Miller ......................... | 382/261 |
| 5,873,081 A | * | 2/1999 | Harel .............................. | 707/3 |
| 6,071,004 A | * | 6/2000 | Le Gall et al. ............... | 712/22 |
| 6,173,388 B1 | * | 1/2001 | Abercrombie et al. ........ | 712/22 |
| 6,295,546 B1 | * | 9/2001 | Adiletta ...................... | 708/402 |

* cited by examiner

Primary Examiner—Bhavesh M. Mehta
Assistant Examiner—Abolfazl Tabatabai
(74) Attorney, Agent, or Firm—Fay, Sharpe, Fagan, Minnich & McKee, LLP

(57) ABSTRACT

A novel method for implementing a filter for processing discrete signal image is presented having the steps of first obtaining a plurality of sample values from said discrete signal image and then using each sample value to retrieve a bit vector from a plurality of tables. Afterwhich a logical AND on the set of retrieved bit vectors is performed and the position of the largest non-zero bit is determined. Then, this position is used to index into a table of filter values. The corresponding filter value is then retrieved from the table.

13 Claims, 4 Drawing Sheets

METHOD FOR GENERATING INCREASING SHIFT-INVARIANT FILTERS

REFERENCE TO COPENDING APPLICATIONS

Attention is directed to commonly owned and assigned copending Application Numbers:

U.S. Ser. No. 09/561,609, filed Apr. 27, 2000 entitled "METHOD FOR GENERATING SHIFT-INVARIANT FILTERS".

U.S. Ser. No. 09/561,608, filed Apr. 27, 2000 entitled "A METHOD TO PROGRAM A NONLINEAR FILTER".

U.S. Ser. No. 09/559,476, filed Apr. 27, 2000 entitled "A METHOD TO PROGRAM BIT VECTORS FOR AN INCREASING NONLINEAR FILTER".

The disclosure of the above mentioned copending applications are incorporated herein by reference in their entirety.

FIELD OF THE INVENTION

The present invention is generally related to the field of signal processing and, more particularly, to the field of programmable hardware and/or software filtering of image data in compact architectures with windowed shift-invariant filters operating on signals with two or more levels per sample.

BACKGROUND OF THE INVENTION

In the arts it is often necessary to manipulate a received signal or image, for both practical and operational reasons. For instance, the signal may need to be enhanced prior to some secondary operation being performed on the data such as printing with a laser printer. A scanned image may eventually need to be restored or reconstructed to its original form. Other operations can take the form of resolution conversion, thinning or thickening, among others. In order to manipulate the received signal or image data in these instances, mathematical operations are often performed. To achieve this, the discrete signal or image is often converted into or represented by a mathematical sequence or array of discrete values. For example, binary signals or images often take the form of discrete values of [0,1] and 8-bit gray-scale images often take the form of values in the range of [0..255]. The field of discrete signal and image processing, both theoretical and applied, is relatively dominated by mathematics in the form of specific methods and applications.

Many methods of signal or image processing use one or more applications involving filters. A filter operates by capturing a windowed observation of an image or signal. A windowed observation is a collection or vector of samples from the captured image or signal. Based on this vector, a decision, based on some formula or algorithm, is made about the image or signal at a particular position within the image or signal. In general, a filter operates on a set of signal or image samples which are mathematically written as a vector having the form of $(X_1 \ldots, X_N)$.

Many techniques can be found in the arts, of which the following are representative and which are hereby incorporated by reference being made thereto. For example, a filter can assign a new sample value to the center pixel of a window in order to accomplish the overall goal of a restoration or enhancement of a degraded image, as taught by *Enhancement and Restoration of Digital Documents*, R. P. Loce and E. R. Dougherty, SPIE Press, 1997, and *Enhancement of Digital Documents*, R. P. Loce and E. R. Dougherty, Electronic Imaging Technology, SPIE Press 1999, and *Two-Dimensional Signal and Image Processing*. J. S. Lim, Prentice Hall, 1990. Many other operations are found in the known literature. Furthermore, other applications of filters used in signal or image processing include, resolution conversion, object detection, speckle-removal, and edge enhancement.

Nonlinear image or signal processing is a general representation of signal or image filtering based on a logical decomposition of a filter into a set of relatively simple operators. Any windowed increasing shift-invariant filter can be represented as a combination of simple operations called erosions as taught by *Nonlinear Filters for Image Processing*, E. R. Dougherty and J. Astola (eds.), SPIE/IEEE Press, 1999. The term nonlinear refers to the entire class of windowed filters that includes linear filters, i.e., those filters computed by convolution.

Since filters can be highly complex and repeatedly be executed millions of times in rapid succession in order to perform a single operation on a given image or signal, what is needed in the arts are compact, efficient computing architectures directed towards this end. Efficient architectures depend on filter representations. If a filter can be broken down into its base operations, it might be possible to execute the relatively simple operations in parallel in order to achieve high-speed execution and overall efficiency.

*Computational Gray-Scale Momphology on Lattices (A Comparator-Based Image Algebra) Part I: Architecture*, E. R. Dougherty and D. Sinha, Real Time Imaging, Vol.1, No.1, 1995, teaches a computer architecture using representations that perform tests in parallel. The representational methods as taught therein express any filtering operation as a collection of logical tests or operations wherein each logical test is associated with a value. If a windowed observation satisfies a test, the filter output is then associated with that value. Although the above architecture is not practical for filters requiring many tests, it does teach a general representational method.

Increasing filters are of special interest in the art of signal processing because they can be more efficiently implemented than a general nonlinear filter. An increasing filter F has the mathematical property that if $(x_1, \ldots, x_N) <= (y_1, \ldots, y_N)$, then $F(x_1, \ldots, x_N) <= F(y_1, \ldots, y_N)$. It is known in the art that increasing filters can have two orders of magnitude fewer logical comparisons in their representations that a general non-increasing filter. Applications of increasing filters known in the art are thinning, thickening, hole-filling, restoration of ragged edges, resolution conversion, median filtering, and noise removal.

It is the aim of the present invention to overcome the conventional prior art print limitations, as described above, by performing logical comparisons in a more compact and efficient way.

SUMMARY OF THE INVENTION

A method for implementing a filter for processing discrete signal image is presented having the steps of first obtaining a plurality of sample values from said discrete signal image and then using each sample value to retrieve a bit vector from a plurality of tables. Afterwhich a logical AND on the set of retrieved bit vectors is performed and the position of the largest non-zero bit is determined. Then, this position is used to index into a table of filter values. The corresponding filter value is then retrieved from the table.

Additional benefits and advantages of the present invention will be set forth in the description which follows, and in part will be obvious from the description, or may be learned by the practice of this invention. The advantages of this invention, as described herein, may be realized and obtained by means particularly pointed out and distinctly claimed in the appended claims, taken in conjunction with the accompanying drawings and detailed specification.

BRIEF DESCRIPTION OF THE DRAWINGS

In order that the manner in which the above-recited and other advantages and objects of the present invention are obtained, a more particular description of this invention, briefly described above, will be rendered by reference to a specific embodiment thereof which is illustrated in the appended drawings. Understanding that these drawings depict only a typical embodiment of the present invention and are not therefore to be considered in any way limiting of its scope, this invention will be described and explained with additional specificity and detail through the use of the accompanying drawings, in which.

DETAILED DESCRIPTION OF THE INVENTION

What is presented is a method for implementing a filter on a signal which pre-computes information to enable increasing filter computation by a relatively small number of deterministic sequence of table lookups and bit-wise logical operations. The present invention is directed towards those cases of windowed shift-invariant filters operating on signals with two or more levels per sample.

Briefly, the method for implementing a filter for processing discrete signal image has the steps of first obtaining a plurality of sample values from said discrete signal image and then using each sample value to retrieve a bit vector from a plurality of tables. Afterwhich a logical AND on the set of retrieved bit vectors is performed and the position of the largest non-zero bit is determined. Then, this position is used to index into a table of filter values. The corresponding filter value is then retrieved from the table.

It should also be understood that one skilled in this art would have a solid background in higher mathematics specifically in the fields of nonlinear signal or image processing, and be readily familiar with the concepts of binary operations, basic filtering concepts and operations, and computer architecture and programming.

An increasing filter, whether operating on binary, gray-scale or other multilevel signals, can be mathematically represented as a set of simple tests of interval memberships. This mathematical fact is developed in *Computational Gray-Scale Morphology on Lattices (A Comparator-Based Image Algebra) Part I: Architecture*, E. R. Dougherty and D. Sinha, Real Time Imaging, Vol. 1, No. 1, 1995, which is incorporated herein by reference. To briefly explain, a filter is represented mathematically as a function which maps a vector X to an output value a. For example, for an 8-bit signal, value of a can be 0, 1, . . . , 255. Call S[a] *a kernel*, the set of all vectors X which map to a and values greater than a. Each output value a of the filter has a set or kernel S[a]. Every possible signal sample X belongs to or is associated with at least one kernel S[a]. Each kernel or set S[a] has at least one minimal or basis element. The set of all minimal elements is called a basis for the filter. Evaluating the filter at X is equivalent to determining the largest basis element which is less than or equal to X and then reporting the filter value associated with that basis element or associated kernel.

Figure 1:
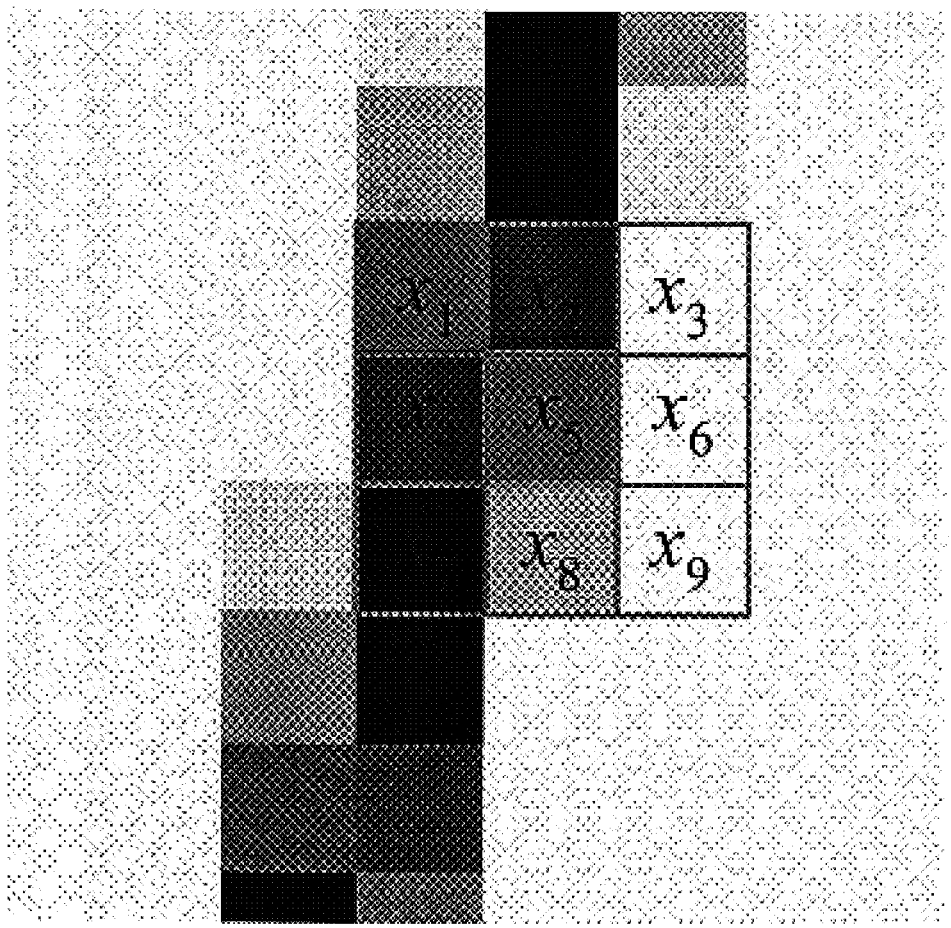
FIG. 1 is an illustration of a segment of a window capture where each pixel is represented by vector notation and represents a windowed observation ($x_1, x_2, x_3, x_4, x_5, x_6, x_7, x_8, x_9$)
Figure 2:
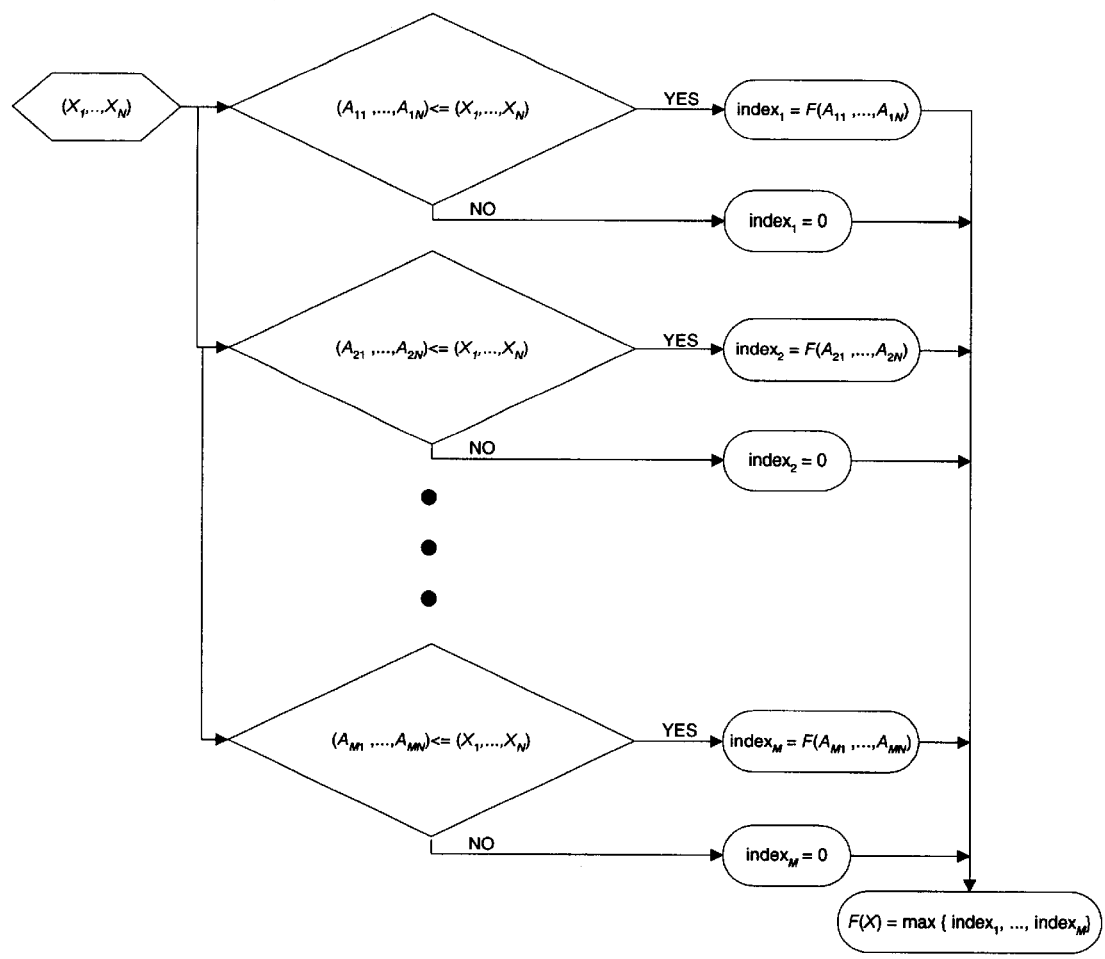
FIG. 2 illustrates a flow chart for the method known in the art for implementing increasing nonlinear filters.

With reference being made to the first step of the present invention, increasing non-linear filters can be represented as a set or sequence of logical tests as to which basis elements are less than or equal to a windowed observation. For example, FIG. 1 illustrates a windowed observation of a captured gray-scale image wherein nine samples or pixels are represented by vector notation. From these nine samples of captured pixels, a filter would be employed to make one or more decisions or observations with respect to the entire captured gray scale image. Given an observation with N samples, as represented by $X=(X_1, \ldots, X_N)$, and the desire to test whether X is greater than or equal to a basis element given by $A=(A_1, \ldots, A_N) \leq X$, wherein component-wise: $A_i \leq X_i$ for each $i=1, \ldots, N$, a filter can be employed to represent a list of the basis elements A, each having its associated output value. Once it is determined to which basis elements an observation is greater-than-or-equal-to, the output value of the filter can be determined from the maximum basis element. This representation is illustrated in FIG. 2.

Figure 3:
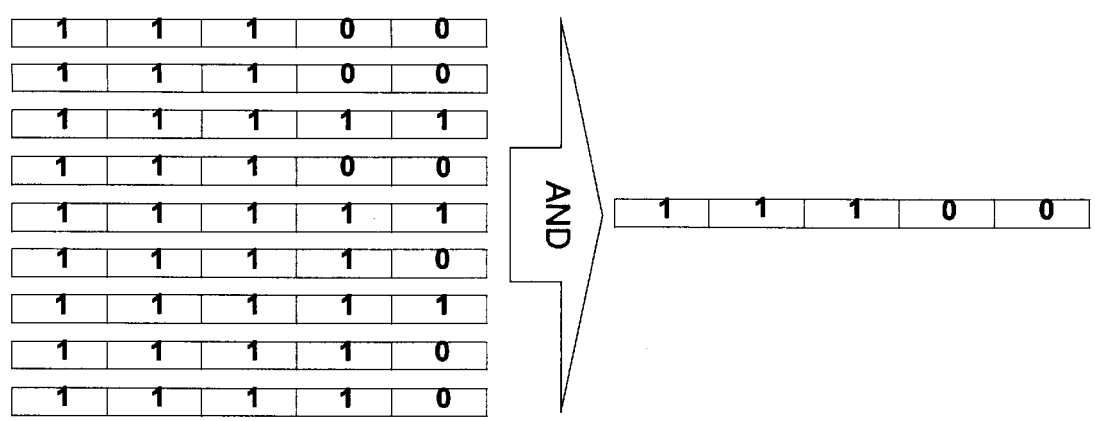
FIG. 3 displays nine example bit vectors from an observation with nine samples to illustrate how samples are related to bit vectors.

Once the plurality of samples from a discrete signal or image have been obtained, the next step of the present invention involves using each sample to look up a bit-vector in a plurality of tables to obtain a plurality of bit vectors. One table is used for each sample in the window. Each column in a table corresponds to a kernel (S[a]) in this representation. Once the plurality of bit vectors has been obtained, the next step of the present invention involves the step of performing a logical AND on the obtained bit vectors in order to generate a resultant bit vector from which a position of non-zero entry in the resultant bit vector can be determined. FIG. 3 displays nine example bit vectors from an observation with nine samples to illustrate how samples are related to bit vectors. In accordance with the present invention, the set of nine example bit vectors are AND'ed together to produce a resultant bit vector. In this example, position 2 (counting from left to right and starting at 0) is the largest position containing a non-zero entry. This position value 2 corresponds to kernel 2 and is used to look up the final filter value. In the previous step, the largest non-zero bit position was determined from a resultant bit vector. The largest position of a non-zero bit corresponds to a label of an interval. A table is maintained that associates each kernel label with a filter output value. The bit position is used to index into this table to produce a final filter output value.

Figure 4:
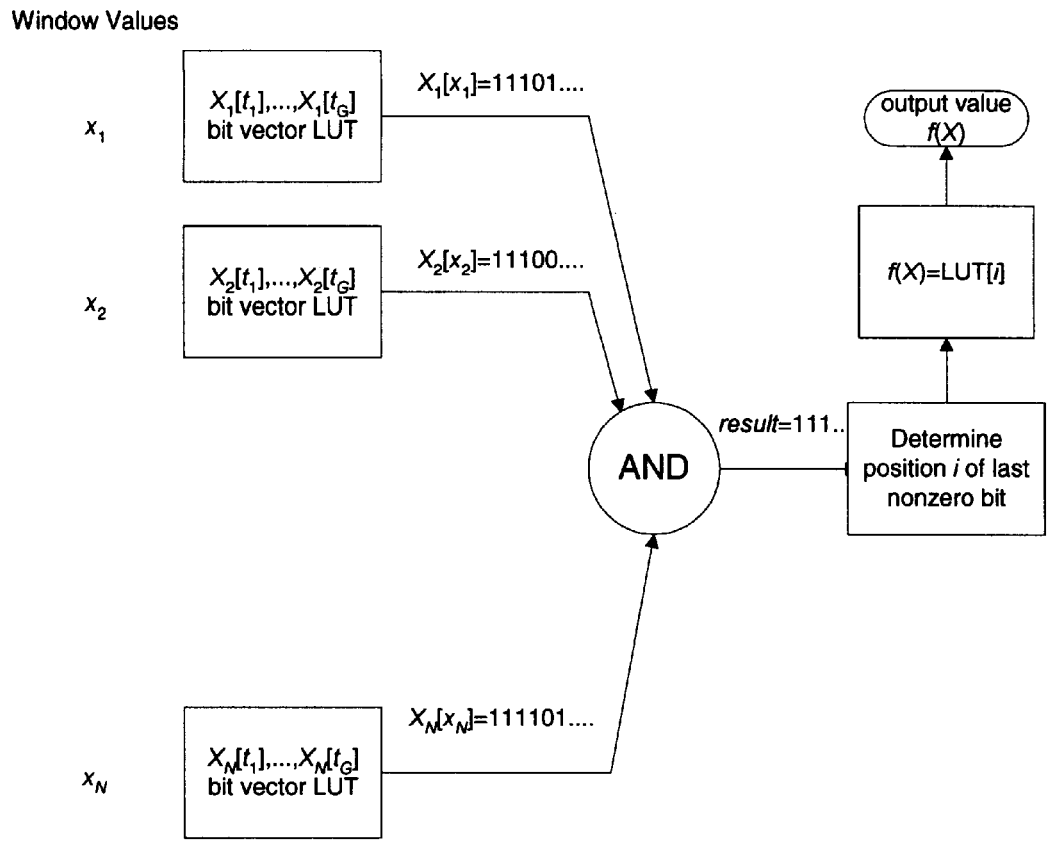
FIG. 4 is a diagram of a bit-vector lookup architecture to evaluate an increasing nonlinear filter.

With reference being now made to FIG. 4, a windowed observation of a discrete signal or image is processed. This observation consists of a plurality of discrete sample values, including, but not limited to, binary values (0 and 1) or 8-bit gray values [0, 1, . . . , 255]. Each sample corresponds to a position with in a window. Each sample position has a bit-vector table associated with it. For example, a nine-pixel window has nine separate bit-vector tables (although they may occupy adjacent memory in a computer). Each table has an entry for each value the sample can take. For example, if the samples are binary, each table would have two entries or bit vectors, one for 0 and one for 1. If the samples are 8-bit gray, each table has 256 bit vector entries, one for each value 0 through 255. Each sample value in an windowed observation is used to look up a bit vector in its corresponding table. A set of bit vectors is thus produced, one bit vector for each value in the sample. The bit vector contains at least one non-zero bit value ('1'). The next step in this invention is to obtain the largest position a non-zero bit value in the bit vector. In the preferred embodiment, the bit values are inspected from left to right until a zero bit is obtained and the previous position is the largest, else if no zero bit is found, the largest position is the last possible bit position. Other embodiments may used specialized hardware logic known in the art to detect the "high" bit. The largest non-zero bit position is used to index a subsequent table to obtain the final filter value. The final filter value is a discrete value representing a new signal or image value.

The present invention allows all windowed shift-invariant filters to be represented and implemented regardless of the number of samples (window size) and the number of levels per sample (e.g., two levels for binary signals and 256 for eight-bit signals). Any windowed increasing shift-invariant filter can be expressed as a set of kernels and corresponding output values.

It should be understood that the present invention will find its implementations in either electronic hardware and/or computer software depending on the user's requirements. Windowed increasing shift-invariant filters represent a plethora of operations including but not limited to processing sampled digital electrical signals such as used in sensors, sound reproduction, servo-mechanical control, audio data compression, ultrasound, and so on. In two dimensions, windowed shift-invariant filters are used to process image data in medical imaging, remote sensing, machine vision and inspection, document processing, synthetic aperture radar, and military target recognition. Examples are object detection, image enhancement, thresholding, noise-removal, image reconstruction, resolution conversion, and various data manipulations to prepare images for printing or display. Samples may also be obtained from higher-dimensional data such as voxels in a digital three dimensional representation of materials. Further, images may have multiple channels, for example, color images may have three or four channels. Remotely sensed images may be "hyperspectral" and have data in tens of spectral bands, for example, a hyperspectral device may have a plurality of sensors, each sensitive to a specific interval of wavelengths such as long infrared, near infrared, visible, ultraviolet, etc. wherein each sensor may generate signals from electromagnetic radiation in its respective band of sensitivity. The windowed increasing shift-invariant filters can also be applied simultaneously on all image bands using the method of the present invention. For example, a filter may have some samples from a long-wave infrared band, some samples from a near infrared band, some from the visible portion of the light spectrum, and some samples from ultraviolet. When taken together, a windowed observation consists of samples separated in space or time as well as wavelength. The method of the present invention readily finds its implementations on sampled signal or image data whether the data are from spatially arranged sensors or from sensors tuned to different wavelengths or a combination thereof.

In summary, what is presented is a method for implementing a filter on a signal utilizing pre-computed fitting information to enable increasing filter computation by a relatively small number of deterministic sequence of table lookups and bit-wise logical operations.

With the above-described detailed description of the preferred embodiment of the present invention and the above-described intended usages and envisioned variations thereto, one skilled in the art of computer architecture and programming and filter design and implementation will readily find their specific implementation in accordance herewith.

This invention may be embodied in other specific forms without departing from its spirit or essential characteristics. The above-described embodiments are to be considered in all respects only as illustrative and not restrictive in scope. The scope of the invention is, therefore, indicated by the appended claims rather than by the above-detailed description. Therefore, all changes which come within the meaning and range of equivalency of the claims are to be considered embraced within their scope.

What is claimed is:

1. A method for implementing an increasing shift invariant filter for processing a discrete signal comprising:

obtaining a plurality of sample values from said discrete signal;

using each sample value to retrieve a bit vector from a plurality of tables, respective ranked bit positions in the bit vector being associate with respective ranked kernels, the respective ranked kernels being associated with ranked sets of filter output values, higher ranked kernels and respective bit positions being associated with respective higher ranked sets of filter output values, the higher ranked sets of filter output values including only filter output values that are higher than at least some of the filter output values included in respective lower ranked sets of filter output values, bit values in the respective ranked bit positions indicating an association or lack of association between the sample value and the respective kernels;

performing a logical operation on the set of retrieved bit vectors, thereby generating a resultant bit vector;

determining a highest ranked bit position in the resultant bit vector having a bit value indicating an association between the plurality of sample values and a respective kernel;

using said highest ranked bit position to index into a table of filter values; and producing the filter value associated with the respective kernel from the table.

2. A method as in claim 1 wherein the logical operation comprises the step of logically AND'ing.

3. A method as in claim 1 wherein the logical operation comprises the step of logically OR'ing.

4. A method for implementing an increasing shift invariant filter comprising:

pre-defining an observation window including a plurality of ordered samples, each ordered sample being associated with a unique sample position in the observation window;

pre-computing respective kernel information for each respective sample position of the plurality of ordered samples and respective possible sample values;

pre-associating the respective pre-computed kernel information for each respective sample position and respective possible sample values with respective bit positions in respective bit vectors associated with each respective sample position and the respective possible sample values;

receiving a discrete signal;

applying the observation window to at least a portion of the received discrete signal, thereby associating respective sample values with each of the ordered samples;

retrieving a respective bit vector for each ordered sample based on the value associated with the ordered sample;

combining the retrieved respective bit vectors to generate a resultant bit vector;

determining a highest ranked bit position in the resultant bit vector having a bit value indicating an association between the plurality of sample values and a respective kernel; and selecting an output response based on the highest ranked bit position.

5. The method of claim 4 wherein pre-computing respective kernel information comprises:

pre-computing a final filter value for each respective sample position of the plurality of ordered samples for a respective possible sample value at each respective sample position.

6. The method of claim 4 wherein receiving a discrete signal comprises receiving a discrete image signal and wherein applying the observation window comprises:

applying the observation window to at least a portion of the received discrete image signal, thereby associating respective pixel contone values with each of the ordered samples.

7. The method of claim 4 wherein combining the retrieved respective bit vectors, determining a highest ranked bit position and selecting an output response comprise:

performing a logical bitwise AND'ing operation on the retrieved bit vectors, thereby generating a resultant bit vector; and selecting an output response based on kernel information associated with the position of a highest ranked non-zero bit in the resultant bit vector.

8. The method of claim 4 wherein combining the retrieved respective bit vectors, determining a highest ranked bit position and selecting an output response comprise:

performing a logical bitwise OR'ing operation on the retrieved bit vectors, thereby generating a resultant bit vector; and selecting an output response based on kernel information associated with the position of a highest ranked zero bit in the resultant bit vector.

9. A system for implementing an increasing shift invariant filter comprising:

means for pre-defining an observation window including a plurality of ordered samples, each ordered sample being associated with a unique sample position in the observation window;

means for pre-computing respective kernel information for each respective sample position of the plurality of ordered samples and respective possible sample values;

means for pre-associating the respective pre-computed kernel information for each respective sample position and respective possible sample values with respective bit positions in respective bit vectors associated with each respective sample position and the respective possible sample values;

means for receiving a discrete signal;

means for applying the observation window to at least a portion of the received discrete signal, thereby associating respective sample values with each of the ordered samples;

means for retrieving a respective bit vector for each ordered sample based on the value associated with the ordered sample;

means for combining the retrieved respective bit vectors to generate a resultant bit vector;

means for determining a highest ranked bit position in the resultant bit vector having a bit value indicating an association between the plurality of sample values and a respective kernel; and means for selecting an output response based on the highest ranked bit position.

10. The system of claim 9 wherein the means for pre-computing respective kernel information comprises:

means for pre-computing a final filter value for each respective sample position of the plurality of ordered samples for a respective possible sample value at each respective sample position.

11. The system of claim 9 wherein receiving a discrete signal comprises receiving a discrete image signal and wherein applying the observation window comprises:

applying the observation window to at least a portion of the received discrete image signal, thereby associating respective pixel contone values with each of the ordered samples.

12. The system of claim 9 wherein the means for combining the retrieved respective bit vectors, determining a highest ranked bit position and selecting an output response comprise:

means for performing a logical bitwise AND'ing operation on the retrieved bit vectors, thereby generating a resultant bit vector; and means for selecting an output response based on kernel information associated with the position of a highest ranked non-zero bit in the resultant bit vector.

13. The system of claim 9 wherein the means for combining the retrieved respective bit vectors, determining a highest ranked bit position and selecting an output response comprise:

means for performing a logical bitwise OR'ing operation on the retrieved bit vectors, thereby generating a resultant bit vector; and means for selecting an output response based on kernel information associated with the position of a highest ranked zero bit in the resultant bit vector.

\* \* \* \* \*